GEORGE G. BURGESS
IMPROVED
WHIFFLETREE
No. 122,992.            Patented Jan. 23, 1872.
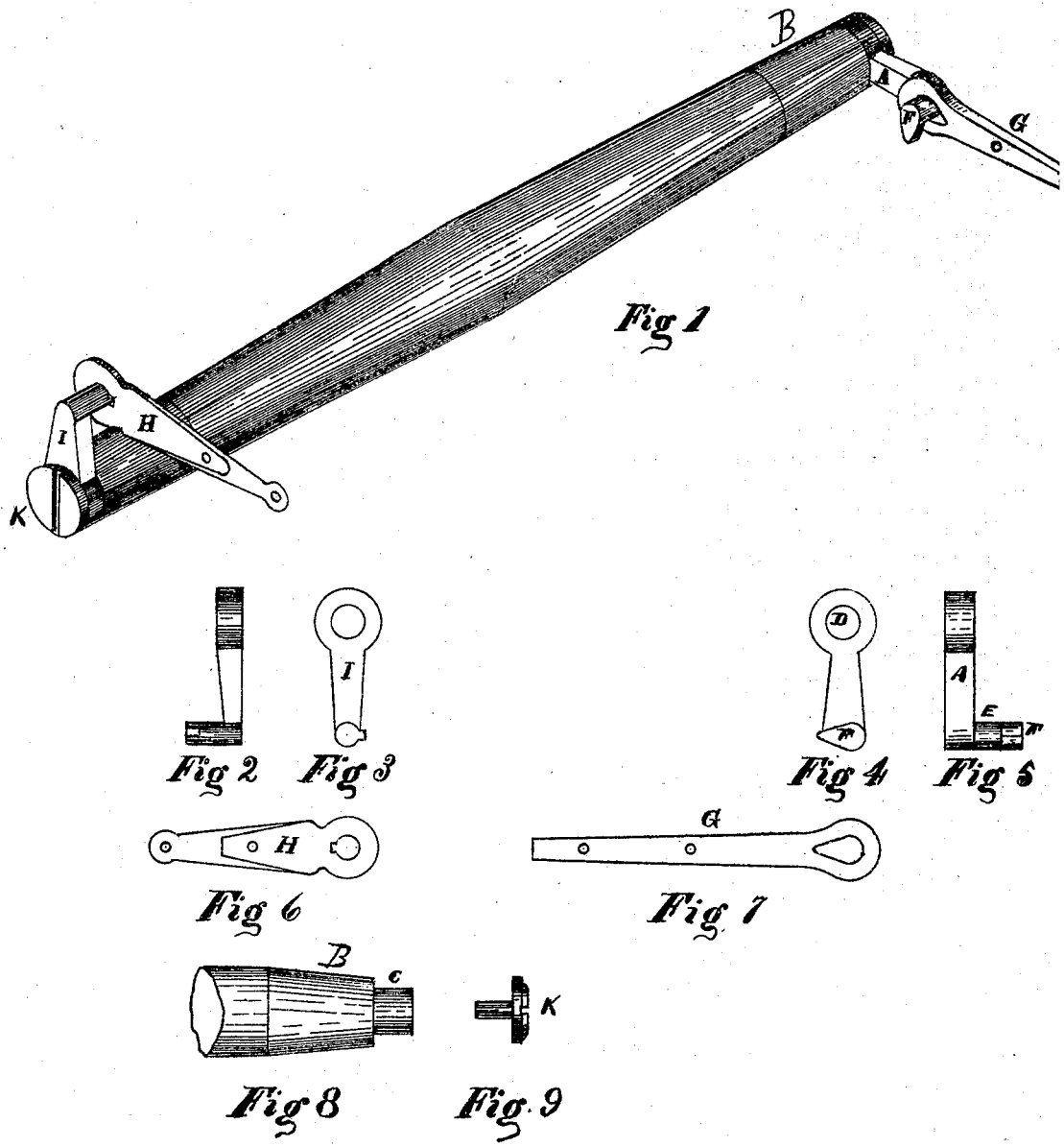
WITNESSES            INVENTOR 122,992

UNITED STATES PATENT OFFICE.

GEORGE G. BURGESS, OF RAWSONVILLE, OHIO.

IMPROVEMENT IN WHIFFLETREES.

Specification forming part of Letters Patent No. 122,992, dated January 23, 1872; antedated January 17, 1872.

I, GEORGE G. BURGESS, of Rawsonville, in the county of Lorain and State of Ohio, have invented certain Improvements in the Construction of Whiffletrees.

The nature of my improvement relates to the construction and arrangement of an adjustable lock draft-hook in such manner as to be readily connected or disconnected by hand, but not otherwise, as hereinafter more fully set forth in the accompanying drawing, in which—

Figure 1 is a perspective view of the lock-hook on the end of the whiffletree or ferrule. Figs. 1, 2, 3, 4, 5, 6, 7, 8, and 9 are perspective views of detached parts.

In the application of my improvement to whiffletrees I use a ferrule on either end like those in ordinary use, with this exeption: On the end of the ferrule B is formed a draft-pin, C, usually of a less size in diameter than the body of the ferrule B, and in length to correspond with the lock draft-hook A, in which the hole D is of a size to fit the pin C. When the draft-hook A is put to its place on the pin C, with the hook part E toward the center of the whiffletree, it may be held on by means of a large-headed nail or screw, K, driven into the end of the ferrule or whiffletree, or both; or such nail or screw may be made to answer the place of the pin C, if not on the end of the ferrule B. On the end of the hook A is formed a lock-block, F, to correspond in size and shape to nearly that of the hole in the cock-eye or tug G, and may be readily passed through the same when the hook A is turned up over the draft-pin C, and is locked into the same, and as soon as the hook A is drawn forward or back a little the lock-block F mismatches the hole in the cock-eye or trace G; the lock-block F not being uniform in shape, and set eccentrically on the hook, which makes it impossible to remove the lock-block in only one way, shown by parts F and H together.

What I claim as my invention, is—

1. The combination of the lock-block F on the end of the adjustable hook A, in combination with the draft-pin C on the end of the ferrule B, substantially in the manner and for the purpose set forth.

2. The construction and arrangement of the adjustable draft-hook A, provided with the lock-block F, by means of which a trace may be locked onto the hook A, substantially in the manner and for the purpose set forth.

GEORGE G. BURGESS.

Witnesses:
SILAS CLARK,
C. A. WHITBECK.